United States Patent [19]

Morris

[11] Patent Number: 4,909,589
[45] Date of Patent: Mar. 20, 1990

[54] ROTATABLE PHOTONIC COUPLING

[76] Inventor: Robert K. Morris, 5128 Gander Rd. West, Dayton, Ohio 45424

[21] Appl. No.: 285,691

[22] Filed: Dec. 11, 1988

[51] Int. Cl.$^4$ .............................................. G02B 6/36
[52] U.S. Cl. ............................... 350/96.20; 350/96.21
[58] Field of Search ................ 350/96.20, 96.21, 96.22

[56] References Cited

U.S. PATENT DOCUMENTS

| | | | |
|---|---|---|---|
| 3,510,667 | 5/1970 | Cleveland et al. | 350/96.24 |
| 3,922,063 | 11/1975 | Marrone | 350/96.20 |
| 4,124,273 | 11/1978 | Henderson et al. | 350/96.21 |
| 4,606,020 | 8/1986 | Ruffin | 370/3 |
| 4,676,588 | 6/1987 | Bowen et al. | 350/96.21 |
| 4,711,516 | 12/1987 | Graber | 350/96.15 |
| 4,749,249 | 6/1988 | Hockaday et al. | 350/96.20 |

*Primary Examiner*—Frank Gonzalez
*Attorney, Agent, or Firm*—Bobby D. Scearce; Donald J. Singer

[57] ABSTRACT

A rotating coupling for transmitting optical signals across an optical fiber juncture is described which in one preferred embodiment comprises a body member having an axial passageway sized for coaxially receiving a first rotatable optical fiber member and a second optical fiber member in generally axial abutting relationship, the passageway defining a cylindrically shaped first enlargement near a first end of the body member and a generally conically shaped second enlargement axially adjacent the first enlargement, a lubricated rotatable bearing member disposed within the first and second enlargements and having a central bore for receiving the first optical fiber member for rotation therewith and having outer shape defined generally by the first and second enlargements, an axial recess in the second end of the body member for receiving an axially resilient spring for holding the second optical fiber member in axial alignment with the first optical fiber member, and a threaded end cap for the second end of the body member.

12 Claims, 1 Drawing Sheet

ROTATABLE PHOTONIC COUPLING

RIGHTS OF THE GOVERNMENT

The invention described herein may be manufactured and used by or for the Government of the United States for all governmental purposes without the payment of any royalty.

BACKGROUND OF THE INVENTION

The present invention relates generally to connecting devices for optical fiber cables and the like, and more particularly to a novel rotating coupling for conducting an optical signal across a movable optical fiber juncture.

Solar photovoltaic array power systems may ordinarily include rotating gimbals at array attach points to allow orientation of the array toward the sun. Power is transferred from the array to the satellite through a conventional electric slip ring. If sensors are included with the array for autonomous control and controllers are placed within the vehicle. means must be provided to transfer sensor data signals to the controllers. Fiber optic cables are desirable for such data transfer because of the high data handling capability and low mass which characterize fiber optic systems.

The invention solves or reduces in critical importance shortcomings in conventional fiber optic coupling devices by providing a coupling for two fiber optic cables which allows one or both to rotate freely with respect to the other while maintaining good optical coupling between the ends of the cables. In a first embodiment of the invention, one fiber optic cable or bundle is encased in a substantially frictionless support channel in which it can rotate while in substantial abutment with another fixed optical cable or bundle. In a second embodiment of the invention, both cables are rotatable, the support member including ball bearings rotatably holding the cables in place.

The invention may be used in substantially any application where a signal is carried by fiber optics through a rotating fixture, such as in the gimbal of a tracking system on a satellite. The invention is a substantial improvement over existing fiber optic connectors in that the coupling allows optical fiber cables or bundles to rotate on their axes with respect to one another, may comprise materials substantially lighter than metallic slip rings used for electrical signal transmission, and is resistant to interference from external electromagnetic sources, which is a significant advantage for data transmitting systems.

It is therefore a principal object of the invention to provide a coupling for transmitting optical signals across a rotating optical fiber juncture.

It is a further object of the invention to provide a coupling for transmitting optical data signals across the juncture of two abutting rotating optical fiber bundles.

These and other objects of the invention will become apparent as the detailed description of representative embodiments proceeds.

SUMMARY OF THE INVENTION

In accordance with the foregoing principles and objects of the invention, a rotating coupling for transmitting optical signals across an optical fiber juncture is described which in one preferred embodiment comprises a body member having an axial passageway therethrough sized for coaxially receiving a first rotatable optical fiber member and a second optical fiber member in generally axial abutting relationship, the passageway defining a cylindrically shaped first enlargement near a first end of the body member and a generally conically shaped second enlargement axially adjacent the first enlargement, a lubricated rotatable bearing member disposed within the first and second enlargements and having a central bore for receiving the first optical fiber member for rotation therewith and having outer shape defined generally by the first and second enlargements. an axial recess in the second end of the body member for receiving an axially resilient spring for holding the second optical fiber member in axial alignment with the first optical fiber member, and a threaded end cap for the second end of the body member.

DESCRIPTION OF THE DRAWINGS

The invention will be more clearly understood from the following detailed description of representative embodiments thereof read in conjunction with the accompanying drawings wherein.

DETAILED DESCRIPTION

Figures 1, 2:
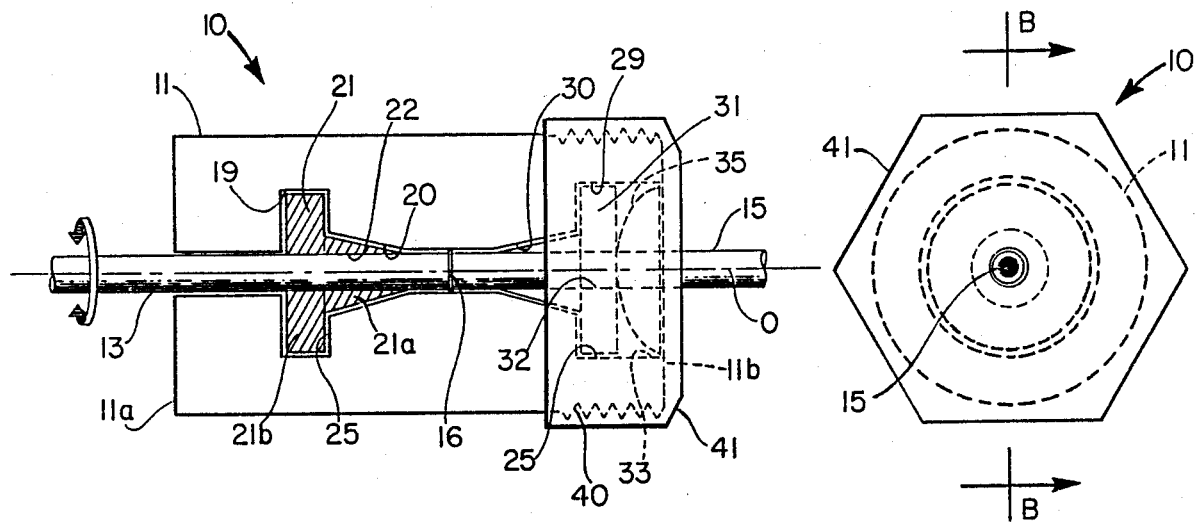
FIG. 1 is an end view of one embodiment of the rotatable optical fiber coupling of the invention.
FIG. 2 is a view along line B—B of the coupling of FIG. 1.

Referring now to the drawings, FIG. 1 presents an end view of one embodiment of the rotatable optical fiber coupling 10 of the invention, and FIG. 2 is a view along line B—B of FIG. 1 showing an axial sectional view of coupling 10. Coupling 10 comprises a member 11 of suitable overall shape, such as the cylindrical shape suggested in FIGS. 1,2 for optically coupling a first optical fiber bundle cable 13 which may be rotating, with a second optical fiber bundle cable 15 which may be fixed. Optical signals are transmitted between cables 13,15 along optical axis 0 across interface 16 formed at the abutting ends of cables 13,15.

Axial passageway 17 is defined along axis 0 through member 11 from a first end 11a to a second end 11b thereof for receiving the various elements comprising the rotatable assembly of coupling 10. Passageway 17 defines near first end 11a of member 11 a first cylindrically shaped enlargement 19 and a second generally conically shaped enlargement 20 for receiving rotatable bearing member 21. Bearing member 21 has an axial hole 22 therethrough sized for tightly receiving cable 13 and preventing axial movement of cable 13 in the assembly of coupling 10. Bearing member 21 may comprise any suitable structural material as would occur to one with skill in the field of the invention although suitable optical material e.g. a dielectric) may be preferable as being compatible with the material comprising cable 13 Member 21 preferably comprises a one-piece structure having shape suggested in FIG. 2 including a conical shaped portion 21a and a cylindrical portion 21b, or may comprise two separate pieces having respective shapes of portions 21a,21b, tightly (e.g. press fit) receiving or otherwise affixed to cable 13 for rotation therewith and disposed for rotation within enlargements 19,20 of passageway 17. The conical surface on portion 21a of bearing member 21 provides suitable rotatable bearing surface for rotation of bearing member 21 and cable 13 with respect to member 11. The outer surface of bearing member 21 and the inner surfaces defining enlargements 19,20 of passageway 17 are preferably coated with a lubricant 25 such as graphite or Teflon ® so that bearing member 21 may rotate substantially friction free within member 11. For a configuration wherein cable 15 is fixed, a cleaved end of cable 15 may simply be held by clamping within passageway 17 to define optical interface 16 across which optical signals are transmitted in accordance with the principal function of the invention.

In an alternative embodiment of the invention for fixed or rotatable cable 15, passageway 17 may define in the second end 11b of member 11 enlargements 29,30 coaxial with enlargements 19,20 in a configuration which is similar to but reversed from respective enlargements 19,20 for receiving bearing member 31 configured substantially as described above for bearing member 21. and including axial hole 32 sized for tightly receiving cable 15. In addition, end 11b may include axial countersunk recess 33 which may be substantially coaxial and radially coextensive with enlargement 29 for receiving circular spring 35 as means for resiliently holding bearing member 31 in the position suggested in FIG. 2 so that the end of cable 15 is against or near the end of cable 13 to define interface 16. Member 31 may comprise any suitable structural material (usually the same as member 21) for firmly holding cable 15 in manner similar to the assembly of cable 13 and member 21. The outer surfaces of member 31 and the inner surfaces defining enlargements 29,30 may also be coated with lubricant 25 for a configuration wherein cable 15 is rotatable within member 11.

The outer surface of member 11 at end 11b may be threaded as at 40 in order to receive a corresponding threaded lock nut 41 for retaining spring 35. It is noted that first end 11a of member 11 may be configured similarly to end 11b with a corresponding recess, circular spring, outer threads and threaded lock nut for resiliently holding member 21 within member 11. It is further noted that in the assembly of elements of coupling 10 of FIG. 2, it may be necessary for element 11 to comprise two semicylindrical portions joinable along an axial plane to define passageway 17 and to rotatably retain component parts therewithin. Element 11 and associated lock nuts and springs may comprise substantially any structural material (viz, dielectric materials, metallics, etc) as would occur to one skilled in the applicable art considering any size, configuration, weight or other restraints on the system into which coupling 10 is incorporated.

Figures 3, 4:
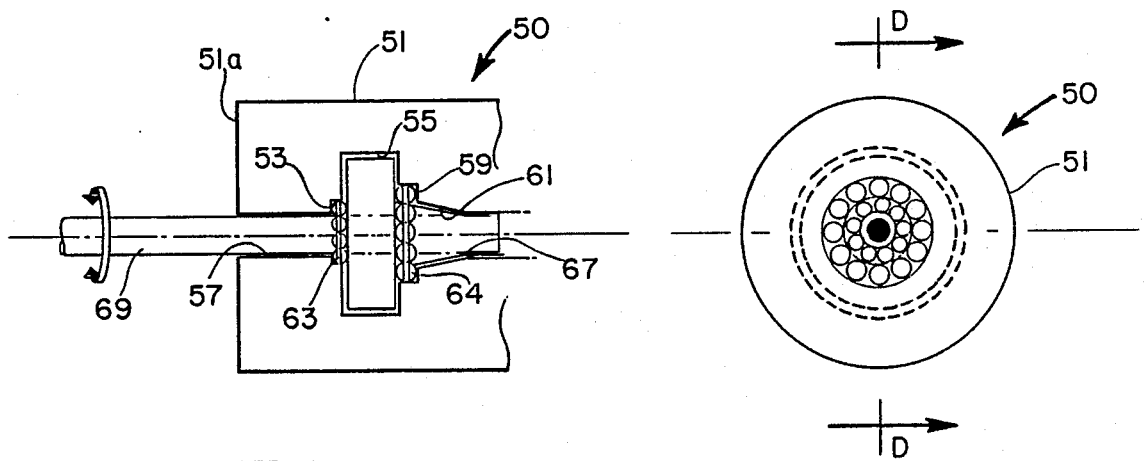
FIG. 3 is an end view of an alternative embodiment of the rotatable optical fiber coupling of the invention.
FIG. 4 is a view along line D—D of the coupling of FIG. 3.

Referring now to FIGS. 3 and 4, shown therein are end and axial sectional view of another embodiment of a rotatable optical fiber coupling of the invention. For simplicity of illustration, only one end 51a of member 51 comprising coupling 50 is shown. it being understood that the other end (not shown) may be similarly but oppositely configured. In FIG. 4, bearing race 53 is defined at cylindrical enlargement 55 of axial passageway 57 and bearing race 59 is defined at conical enlargement 61 for receiving and retaining bearings 63,64 rotatably supporting rotatable bearing member 65 configured similarly to members 21,31 of the FIG. 2 embodiment, and including axial hole 67 for tightly receiving cable 69. One or both sets of bearing races 53,59 and corresponding bearings 63,64 may be included in separate embodiments of the invention.

The embodiment depicted in FIGS. 1,2 may be most appropriate for conducting optical signals across an interface between cables which rotate at relatively slow speeds, or for accommodating mere change in Position between respective systems to which the two cables are operatively connected. The embodiment of FIGS. 3,4 may be best suited for coupling two cables rotatable at relatively higher angular velocities.

The invention therefore provides a novel rotatable optical fiber coupling for conducting optical signals across a rotating optical fiber joint. It is understood that modifications to the invention may be made as might occur to one skilled in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A rotatable coupling for transmitting optical signals across a rotatable optical fiber juncture, comprising:
    (a) a body member having a first end an a second end and an axial passageway therethrough sized for coaxially receiving a first rotatable optical fiber member through said first end and second optical fiber member through said second end in substantially axial abutting relationship therebetween;
    (b) said axial passageway defining a generally cylindrically shaped first enlargement near said first end and a generally conically shaped second enlargement axially adjacent said first enlargement;
    (c) a rotatable bearing member disposed within said first enlargement and said second enlargement, said bearing member having a central bore for receiving said first rotatable optical fiber member therethrough for rotation therewith, said rotatable bearing member having outer shape defined generally by said first enlargement and said second enlargement of said axial passageway; and
    (d) means in said second end of said body member for resiliently holding said second optical fiber member in axial alignment with said first rotatable optical fiber member.

2. The coupling recited in claim 1 further comprising a layer of lubricant between the outer surface of said rotatable bearing member and the inner surface defining said first enlargement and said second enlargement of said axial passageway.

3. The coupling recited in claim 1 further comprising an axial recess in said second end of said body member and threads defined on the outer surface of said body member at said second end thereof and an endcap received thereby, said endcap including an axial hole for receiving said second optical fiber member and wherein said means for resiliently holding said second optical fiber member in axial alignment with said first rotatable optical fiber member includes an axially resilient circular spring.

4. The coupling recited in claim 1 further comprising a bearing race defined in the wall of said body member defining said first enlargement of said axial passageway, and further comprising a plurality of bearings received by said race and disposed between said wall of said body member defining said first enlargement and said rotatable bearing member.

5. The coupling recited in claim 1 wherein said body member comprises two semicylindrical sections joinable along a common axial plane.

6. A rotatable coupling for transmitting optical signals across a rotatable optical fiber juncture, comprising:
(a) a body member having a first end and a second end and an axial passageway therethrough sized for coaxially receiving a first rotatable optical fiber member through said first end and a second optical fiber member through said second end in substantially axial abutting relationship therebetween;
(b) said axial passageway defining a generally cylindrically shaped first enlargement at said first end and a generally conically shaped second enlargement axially adjacent said first enlargement;
(c) a rotatable bearing member disposed within said first enlargement and said second enlargement, said bearing member having a central bore for receiving said first rotatable optical fiber member therethrough for rotation therewith, said rotatable bearing member having outer shape defined generally by said first enlargement and said second enlargement of said axial passageway;
(d) threads defined on the outer surface of said body member at said first end thereof and an endcap received by said threads, said endcap including an axial hole for receiving said first rotatable optical fiber member;
(e) axially resilient spring means disposed within said first enlargement between said endcap and said rotatable bearing member for resiliently holding said rotatable bearing member within said body member; and
(f) means for resiliently holding said second optical fiber member in axial alignment with said first rotatable optical fiber member.

7. The coupling recited in claim 6 further comprising a layer of lubricant between the outer surface of said rotatable bearing member and the inner surface defining said first enlargement and said second enlargement of said axial passageway.

8. The coupling recited in claim 6 further comprising an axial recess in said second end of said body member and threads defined on the outer surface of said body member at said second end thereof and an endcap received thereby, said endcap including an axial hole for receiving said second optical fiber member and wherein said means for resiliently holding said second optical fiber member in axial alignment with said first rotatable optical fiber member includes an axially resilient circular spring.

9. The coupling recited in claim 6 further comprising a bearing race defined in the wall of said body member defining said first enlargement of said axial passageway and further comprising a plurality of bearings received by said race and disposed between said wall of said body member defining said first enlargement and said rotatable bearing member.

10. A rotatable coupling for transmitting optical signals across a rotatable optical fiber juncture, comprising:
(a) a body member having a first end and a second end and an axial passageway therethrough sized for coaxially receiving a first rotatable optical fiber member through said first end and a second rotatable optical fiber member through said second end in substantially axial abutting relationship therebetween;
(b) said axial passageway defining a generally cylindrically shaped first enlargement at each end of said body member, and a generally conically shaped second enlargement axially adjacent each said first enlargement;
(c) first and second rotatable bearing members resiliently disposed within respective first and second ends of said body member within said first enlargements and adjacent said second enlargements, each bearing member having a central bore for receiving respective said first rotatable optical fiber member and said second rotatable optical fiber member for rotation therewith, each rotatable bearing member having outer shape defined generally by said first enlargements and adjacent said second enlargements of said axial passageway;
(d) threads defined on the outer surface of said body member at each said first end and said second end thereof and a pair of endcaps received by said threads, each endcap including an axial hole for receiving respective said first rotatable optical fiber member and said second rotatable optical fiber member; and
(e) axially resilient spring means disposed between each said endcap and respective rotatable bearing member in each end of said body member for resiliently holding said rotatable bearing member within said body member.

11. The coupling recited in claim 10 further comprising a layer of lubricant between the outer surface of said rotatable bearing member and the inner surface defining said first enlargement and said second enlargement of said axial passageway.

12. The coupling recited in claim 10 further comprising a bearing race defined in the wall of said body member adjacent each said first enlargement of said axial passageway, and further comprising a plurality of bearings received by each said race.

* * * * *

UNITED STATES PATENT AND TRADEMARK OFFICE
CERTIFICATE OF CORRECTION

PATENT NO. : 4,909,589

DATED : March 20, 1990

INVENTOR(S) : Robert K. Morris

It is certified that error appears in the above-identified patent and that said Letters Patent is hereby corrected as shown below:

Col 2, line 58, "e.g. a dielectric)" should be
---(e.g. a dielectric)---.

Col 2, line 59, after "cable 13" a period should be inserted.

Col 3, line 20, "member 21." should be ---member 21,---.

Col 3, line 57, "is shown." should be ---is shown,---.

Col 3, line 64, "21.31" should be ---21,31---.

Col 4, line 4, "Position" should be ---position---.

Col 4, line 27 in claim 1, "and second" should be
---and a second---.

Col 6, line 1 in claim 9, after "passageway" a comma should be inserted.

Signed and Sealed this

Fourteenth Day of July, 1992

Attest:

DOUGLAS B. COMER

Attesting Officer

Acting Commissioner of Patents and Trademarks